(12) United States Patent
Frisco et al.

(10) Patent No.: US 12,304,133 B2
(45) Date of Patent: May 20, 2025

(54) CONFORMABLE SHIELDING FILM

(71) Applicant: 3M INNOVATIVE PROPERTIES COMPANY, St. Paul, MN (US)

(72) Inventors: Sara Hemmer Frisco, Blaine, MN (US); Guy M. Kallman, Woodbury, MN (US); Kristal L Schutta, Forest Lake, MN (US); Thomas B. Stirling, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 762 days.

(21) Appl. No.: 17/260,646

(22) PCT Filed: Jul. 15, 2019

(86) PCT No.: PCT/IB2019/056037
§ 371 (c)(1),
(2) Date: Jan. 15, 2021

(87) PCT Pub. No.: WO2020/016757
PCT Pub. Date: Jan. 23, 2020

(65) Prior Publication Data
US 2021/0394427 A1 Dec. 23, 2021

Related U.S. Application Data

(60) Provisional application No. 62/700,524, filed on Jul. 19, 2018.

(51) Int. Cl.
*B29C 51/14* (2006.01)
*B29C 51/10* (2006.01)
(Continued)

(52) U.S. Cl.
CPC .............. *B29C 51/14* (2013.01); *B29C 51/10* (2013.01); *B32B 27/08* (2013.01); *B32B 27/304* (2013.01);
(Continued)

(58) Field of Classification Search
None
See application file for complete search history.

(56) References Cited

U.S. PATENT DOCUMENTS 4,900,611 A 2/1990 Carroll, Jr.
5,125,994 A 6/1992 Harasta
(Continued)

FOREIGN PATENT DOCUMENTS

DE 10057164 A1 5/2002
JP 2004142439 5/2004
(Continued)

OTHER PUBLICATIONS

Fukada JP2004142439 English Translation 2004 (Year: 2004).*
International Search Report for PCT International Application No. PCT/IB2019/056037, mailed on Dec. 19, 2019, 3 pages.

*Primary Examiner* — Jacob T Minskey
*Assistant Examiner* — Adrien J Bernard
(74) *Attorney, Agent, or Firm* — Julie Lapos-Kuchar

(57) ABSTRACT

A method of thermoforming a rigid film construction. The method comprises: applying a rigid film construction to a mold; and heating the rigid film construction until it conforms to the mold. The rigid film construction includes a rigid polymeric film layer; a light-modifying film layer; and a shielding film layer. The shielding film comprises polymethyl methacrylate (PMMA); and the shielding film layer contacts the surface of the mold.

20 Claims, 3 Drawing Sheets

(51) Int. Cl.
  *B32B 27/08* (2006.01)
  *B32B 27/30* (2006.01)
  *B32B 27/36* (2006.01)
  *B29K 33/00* (2006.01)
  *B29K 67/00* (2006.01)
  *B29K 69/00* (2006.01)
  *B29L 11/00* (2006.01)
  *G02B 5/02* (2006.01)

(52) U.S. Cl.
  CPC .......... *B32B 27/308* (2013.01); *B32B 27/365* (2013.01); *B29K 2033/12* (2013.01); *B29K 2067/003* (2013.01); *B29K 2069/00* (2013.01); *B29K 2995/0029* (2013.01); *B29L 2011/00* (2013.01); *B32B 2250/03* (2013.01); *B32B 2250/24* (2013.01); *B32B 2307/414* (2013.01); *B32B 2307/732* (2013.01); *B32B 2551/00* (2013.01); *G02B 5/0268* (2013.01)

(56) References Cited

U.S. PATENT DOCUMENTS

| | | |
|---|---|---|
| 6,284,183 B1 | 9/2001 | Roys |
| 6,902,818 B2 | 6/2005 | Murschall |
| 2002/0045056 A1 | 4/2002 | Grefenstein |
| 2004/0106703 A1 | 6/2004 | Etzrodt et al. |
| 2004/0219366 A1 | 11/2004 | Johnson |
| 2005/0233130 A1 | 10/2005 | Grefenstein |
| 2009/0039556 A1 | 2/2009 | Sawada |
| 2015/0273814 A1 | 10/2015 | Gastaldi |
| 2018/0279471 A1 | 9/2018 | Chen |
| 2019/0366616 A1* | 12/2019 | Berny .................... B29C 51/14 |

FOREIGN PATENT DOCUMENTS

| | | |
|---|---|---|
| JP | 2006-341388 A | 12/2006 |
| JP | 2016068275 | 5/2016 |
| WO | WO 1998-41399 | 9/1998 |
| WO | WO 2014-022049 | 2/2014 |

* cited by examiner

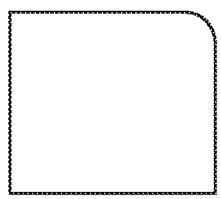
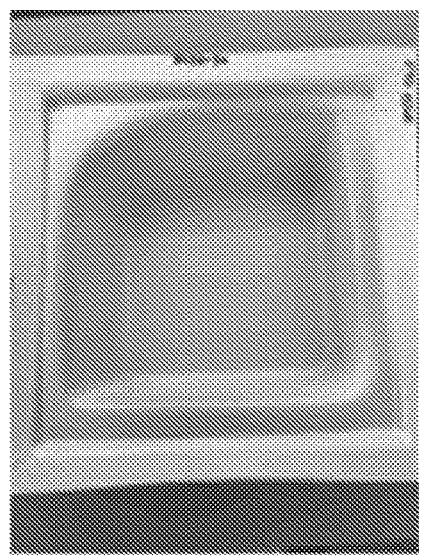
FIG. 4A   FIG. 4B   FIG. 4C
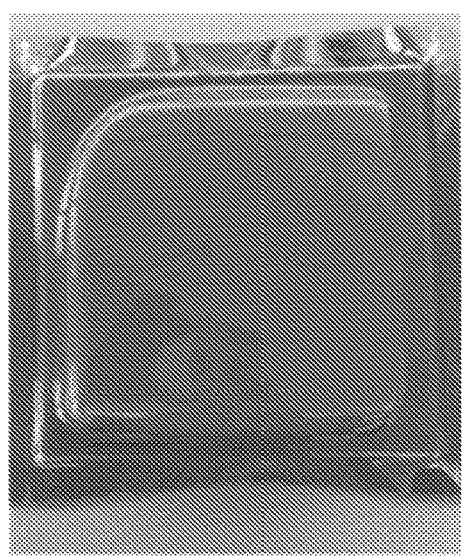
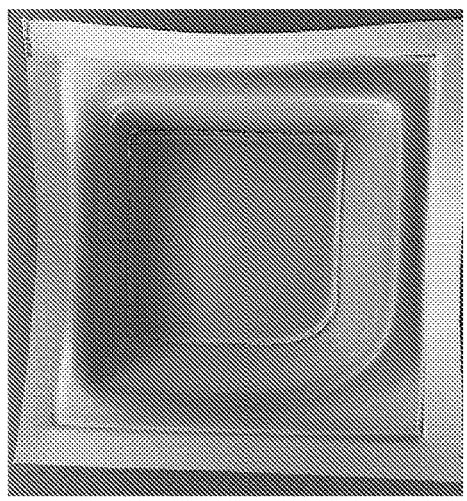
FIG. 5A   FIG. 5B
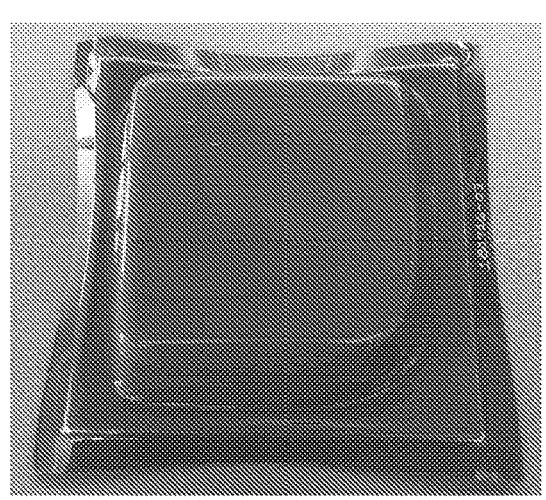
FIG. 6A   FIG. 6B

CONFORMABLE SHIELDING FILM

BACKGROUND

Many businesses and other organizations use exterior signs made from a molded or thermoformed stack of rigid films. Rigid films used for thermoforming often include polyvinyl chloride (PVC) combined with other substrates, such as polycarbonate. Generally, thermoforming rigid films to create signs or other rigid structures includes the steps of applying a film or several materials laminated together to the surface of a mold, heating the mold, and using vacuum conditions to draw the film to the surface of the mold. The mold is then cooled and the newly formed shape can be removed from the mold.

In some instances, the surface of the mold damages the surface of the laminated material that it contacts. This is particularly true when a light-modifying film layer (often much thinner than the rigid polymeric substrate the film layer is laminated to) contacts the surface of the mold. As a result, it can be very difficult to create a high-quality thermoformed structure damaging the resulting thermoformed article, thus creating both visual and functional defects.

SUMMARY

The present disclosure solves problems associated with thermoforming rigid film constructions for a variety of applications, including illuminated signage. Much illuminated signage has a convex outer surface, with a light source on the concave or interior side of the sign. Much illuminated signage is also colored or includes some light modifying feature. This color or feature is achieved by laminating a thinner piece of film to one side of a thicker rigid film, and then thermoforming the rigid film construction. It is often preferred to laminate the light modifying film layer to the side of the rigid film that will form the interior of the illuminated signage. Because the more durable and thicker rigid film is on the exterior of the sign in this construction, the sign has improved longevity and weatherability, and can better withstand sun, rain, heat, snow and exposure than the thinner, light modifying film can.

However, at the same time, the thermoforming process is typically more efficient when a rigid film construction is thermoformed with a "male" mold (a mold with primarily convex features) as opposed to a "female" mold (with primarily concave features. This is because it is easier to draw a heated film to a convex surface than to achieve precise conformance of the heated film to a concave surface. Additionally, concave molds can be more prone to leaving mold surface artifacts on the resulting thermoformed article. Molds with primarily concave features can also be more expensive to maintain for repeated use.

To achieve optimal thermoforming for lighted signage, a color-modifying layer would be in the interior of the sign, and a primarily convex mold would be used to thermoform the sign. However, this requires the thinner color modifying layer to come into contact with the mold surface, which often causes damage to the layer, thus resulting in visual and functional defects in the finished product.

The present disclosure solves this problem by providing the advantages of efficiently thermoforming a rigid film construction while minimizing damage to a light-modifying layer of the construction. The present disclosure also provides a method for thermoforming a rigid film construction with increased weatherability by allowing use of a mold where the rigid film construction is thermoformed to a convex surface of the mold. The present disclosure also allows for easier of registration of the rigid film construction relative to the surface of a primarily convex mold by allowing a user to position the desired portion of the rigid film construction directly against the convex surface of the mold. A rigid film construction consistent with the present disclosure also provides increased durability when thermoformed because it allows for the rigid polymeric film to form the exterior of the sign and be exposed to weather and elements, thereby protecting the other layers from exposure.

In one instance, the present disclosure provides for a method of thermoforming a rigid film construction. The method comprises: applying a rigid film construction to a mold; and heating the rigid film construction until it conforms to the mold. The rigid film construction includes a rigid polymeric film layer; a light-modifying film layer; and a shielding film layer. The shielding film comprises polymethyl methacrylate (PMMA); and the shielding film layer contacts the surface of the mold.

In another instance, the present disclosure provides a rigid film construction for use in a thermoforming process, the rigid film construction comprising: a rigid polymeric film layer; a light-modifying film layer; and a shielding film layer polymethyl methacrylate (PMMA). The shielding film layer is configured to contact the surface of a mold; and wherein the rigid film construction conforms to the shape of the mold when heated.

In some instances, the rigid polymeric film layer comprises at least one of: polycarbonate, acrylic, polyethylene terephthalate, and polyethylene terephthalate glycol.

In some instances, the method further comprises the step of applying a vacuum to the side of the male mold opposite the rigid film construction.

In some instances, the light modifying film layer is a vinyl film.

In some instances, the light modifying film layer further comprises a printed ink layer.

In some instances, the light modifying film layer is translucent.

In some instances, the light modifying film layer serves as a diffuser.

In some instances, the shielding film layer is optically inert.

In some instances, the shielding film layer consists of polymethyl methacrylate.

In some instances, the shielding film layer has a thickness of less than 100 micrometers.

In some instances, the shielding film layer has a thickness of less than 100 micrometers.

BRIEF DESCRIPTION OF THE DRAWINGS

The invention may be more completely understood when considered with the following detailed description in connection with the accompanying drawings in which:

FIGS. 4A-4C show a schematic of an experiment set up for laminated materials and the mold.

FIGS. 5A and 5B show E1 thermoformed results.

FIGS. 6A and 6B show CE1 thermoformed results.

The embodiments shown and described herein may be utilized and structural changes may be made without departing from the scope of the invention. The figures are not necessarily to scale. Like numbers used in the figures refer to like components. However, the use of a number to refer to a component in a given figure is not intended to limit the component in another figure labeled with the same number.

DETAILED DESCRIPTION

Figure 1:
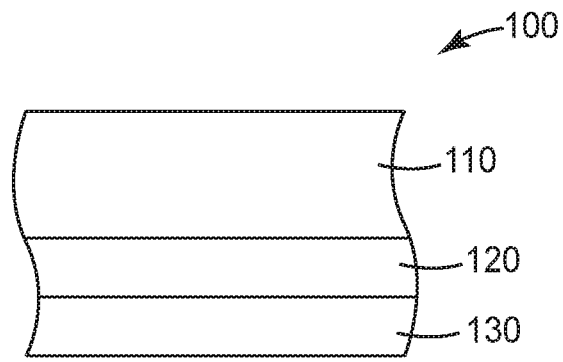
FIG. 1 shows a cross section of a rigid film construction that can be used for thermoforming consistent with the present disclosure.

FIG. 1 shows a cross section of a rigid film construction 100 that can be used for thermoforming consistent with the present disclosure. Rigid film construction 100 includes a rigid polymeric film layer 110, a light modifying film layer 120 and a shielding film layer 130. In some instances, rigid film construction 100 may include additional layers, and in some instances, light modifying film layer 120 and shielding layer 130 may be a single film layer.

Rigid polymeric film 110 may include a variety of polymers, such as polycarbonate, acrylic, polyethylene terephthalate, and polyethylene terephthalate glycol or any combination thereof. Rigid polymeric film 110 is typically thicker than either of light modifying film layer 120 and shielding layer 130, and is rigid, such that it cannot be manually stretched and will substantially maintain its shape unless heated to a softening, melting or flow temperature and reformed. Rigid polymeric film 110 may have a range of thicknesses. For example, rigid polymeric film 110 may have a thickness of approximately 1 mm, 2 mm, 2.5 mm, 3 mm, 3.5 mm 4 mm, or 5 mm, or a thickness in a range between any two of the preceding thicknesses.

Rigid polymeric film 110 may have a range of melting points or temperatures that must be reached to thermoform rigid polymeric film 110. For example, temperatures of 250 F, 275 F, 300 F, 325 F, 350 F, 375 F, 400 F, 425 F, or 450 F or a temperature in a range between any of the two preceding temperatures may be used to thermoform rigid polymeric film 110 or rigid film construction 100.

In some instances, rigid polymeric film 110 is transparent or optically inert so that light modifying film 120 is visible through rigid polymeric film 100.

Light modifying film 120 may be a cast or calendered polymeric film. Light modifying film 120 may be vinyl or non-vinyl film. Examples of types of films consistent with the present disclosure include films made from a variety of polymers or polymer blends, including polyurethanes, polyesters, polyamides, polyolefins, polystyrenes, polycarbonates, polyacrylates, polyvinyl alcohol, polyvinyl butyral, polyvinyl chloride, and fluoropolymers. Commercially available films consistent with the present disclosure include 180mC 3M™ Controltac™ Graphic Film with Comply™ Adhesive and SV480mC 3M™ Envision™ Print Wrap Film.

Light modifying film 120 may have a variety of features that impact the transmission (or reflection) of light incident to rigid film construction 100. For example, light modifying film 120 may be translucent, may serve as a diffuser to improve distribution of light across the surface of a sign formed from the rigid film construction 100. Light modifying film 120 may be structured to include features such as lenses or light extraction features. Light modifying film 120 may include a printed ink layer. A printed ink layer may have a single color, a pattern or an image that is visible through rigid film 110. A printed ink layer may be printed by a variety of methods, including ink jet, gravure or screen printing.

Light modifying film layer 120 may have a range of thicknesses. For example, light modifying film layer 120 may have a thickness of about 25 um, 50 um, 75 um, 100 um, 125 um, 150 um, 175 um, 200 um, or may have a thickness in a range between any of the two preceding thickness values.

Shielding film layer 130 may be made from a variety of materials, but includes polymethyl methacrylate (PMMA). In some instances shielding film layer 130 consists only of PMMA. PMMA has been found to have an unusually and surprisingly effective protective property when applied to or included in rigid film construction 100 such that it protects light modifying layer 120 from damage caused by contact with a mold, and in particular, a mold with a convex surface.

In some instances, shielding film layer 130 is optically inert so that it does not modify or impact transmission of light through shielding film layer 130 before reaching and passing through light modifying layer 120.

Shielding film layer 130 can be relatively thin. For example, in some instances, shielding film layer has a thickness of less than 150, 125, 100, 75 or even 50 micrometers, or has a thickness in a range between any of the two preceding thicknesses.

Rigid polymeric film 110, light modifying film 120 and shielding film layer 130 may be laminated together using pressure sensitive adhesive between each layer. For example, light modifying film 120 may have an adhesive layer (such as a pressure sensitive adhesive) on a major side, which is covered by a removable liner. When creating rigid film construction 110, the liner may be removed and light modifying layer 120 may be adhered to rigid polymeric film 110. Similarly, shielding film 130 may have an adhesive layer on one side and a removable liner covering the adhesive layer. The liner may be removed from the adhesive coating on shielding film 130 and shielding film 130 may be adhered to light modifying film 120, on the side opposite rigid polymeric film 110.

In another instance, light modifying film 120 may be laminated to shielding film 130 in a roll-to-roll lamination process, and the laminated product may then be adhered or laminated to rigid polymeric film 110.

Figure 2:
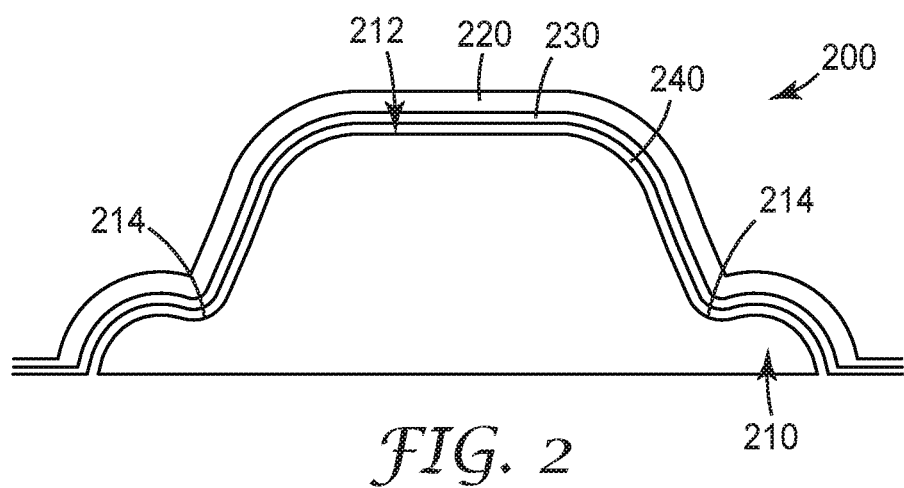
FIG. 2 shows a cross sectional view of a rigid film construction conformed to the surface of a mold with primarily convex features.

FIG. 2 shows a cross sectional view of a rigid film construction 200 conformed to the surface of a mold 210 with primarily convex features 212. In FIG. 2, rigid film construction 200 includes a rigid polymeric film 220, a light-modifying 230 and a shielding film 240. Rigid film construction has been applied to the surface of mold 210 such that the shielding film 240 contacts the surface of mold 210. Mold 210 is heated and rigid film construction 200 softens, or in some instances melts or flows as a result of the heat. In some instances, mold 210 may have aperture(s) such that a vacuum can be applied to the surface of the mold opposite the surface rigid film construction 200 is applied to. In those instances, the vacuum then draws the softened rigid film construction to conform to and contact the surface of the mold.

EXAMPLES

Film laminations with and without shielding films were made and thermoformed. The resulting formed shapes were inspected for defects. These examples are merely for illustrative purposes only and are not meant to be limiting on the scope of the appended claims. The following abbreviations are used herein: in =inch; cm=centimeters; ° C.=degrees centigrade; ° F.=degrees Fahrenheit.

MATERIALS

| Abbreviation | Description |
|---|---|
| S1 | Polycarbonate substrate, 0.118 in (0.299 cm) thick sheet, available from Cope Plastics, Peoria IL, as MAKROLON Polycarbonate |
| S2 | Acrylic sheet substrate, 0.118 in (0.299 cm) thick, available from Plaskolite, Columbus Ohio, as OPTIX Acrylic |
| S3 | Polyethylene Terephthalate Glycol substrate, 0.118 in (0.299 cm) thick, available from Plaskolite, Columbus Ohio, as VIVAK PETG |
| T1 | Translucent Graphic film available from 3M Company, St. Paul MN, as 3M ENVISION TRANSLUCENT Film Series 3730-167L |
| D1 | Diffuser film available from 3M Company, St. Paul MN, as 3M ENVISION Diffuser Film 3735-60 |
| D2 | Diffuser film available from 3M Company, St. Paul MN, as 3M ENVISION Diffuser Film 3735-50 |
| B1 | Shielding film available from 3M Company, St. Paul MN, as 3M ELECTROCUT Film 1170C Transparent |
| B2 | Shielding film available from 3M Company, St. Paul MN, as 3M SCOTCHCAL Gloss Overlaminate 8508 |
| B3 | Shielding film available from 3M Company, St. Paul MN, as 3M ENVISION Gloss Overlaminate 8048G |

Test Methods

Visual Inspection Test

The thermoformed parts were evaluated for visual defects using a sign face light box. The white LED's used in the light box were setup such that the average luminous exitance was 2351 lux at the sign face diffuser over a surface area of 99 in$^2$ (639 cm$^2$).

Procedure:
1. The backside of the thermoformed part was visually evaluated (See the Evaluation Criteria).
2. The thermoformed part placed on the light box with the front side facing out. The frontside of the part was visually evaluated in reflected light including top, sides, and 0.5 in (1.27 cm) of the landed area (a flat area typically covered when the thermoformed part is mounted in a sign) below the sides as well as from down web, cross web and oblique angles (See the Evaluation Criteria).
3. The light box LEDs were turned on and the areas of the light box surface not covered by the thermoformed part were shielded to ensure all light was blocked. The frontside of the part was evaluated in transmitted light including top, sides, and 0.5 in (1.27 cm) of the landed area below the sides as well as down web, cross web and oblique angles (See the Evaluation Criteria).
4. The thermoformed part fails the Visual Inspection Test if any of the Evaluation Criteria were observed.
5. Evaluation Criteria:
   i. Cracks, holes, bubbles, wrinkles, melting, burning, or physical imperfections including contamination.
   ii. Shadows, bubbles or non-uniformity caused by lifting of the films after thermoforming. This includes lifting of the translucent from the substrate (bubbles; caused by improper surface prep of the substrate before application or the mold not releasing) and/or lifting between the film layers (shadows; within film construction).
   iii. Non-uniformity of color saturation between the top and sides of the part (i.e. top appears considerably darker than the sides, irregular color on the sides).

Figure 3:
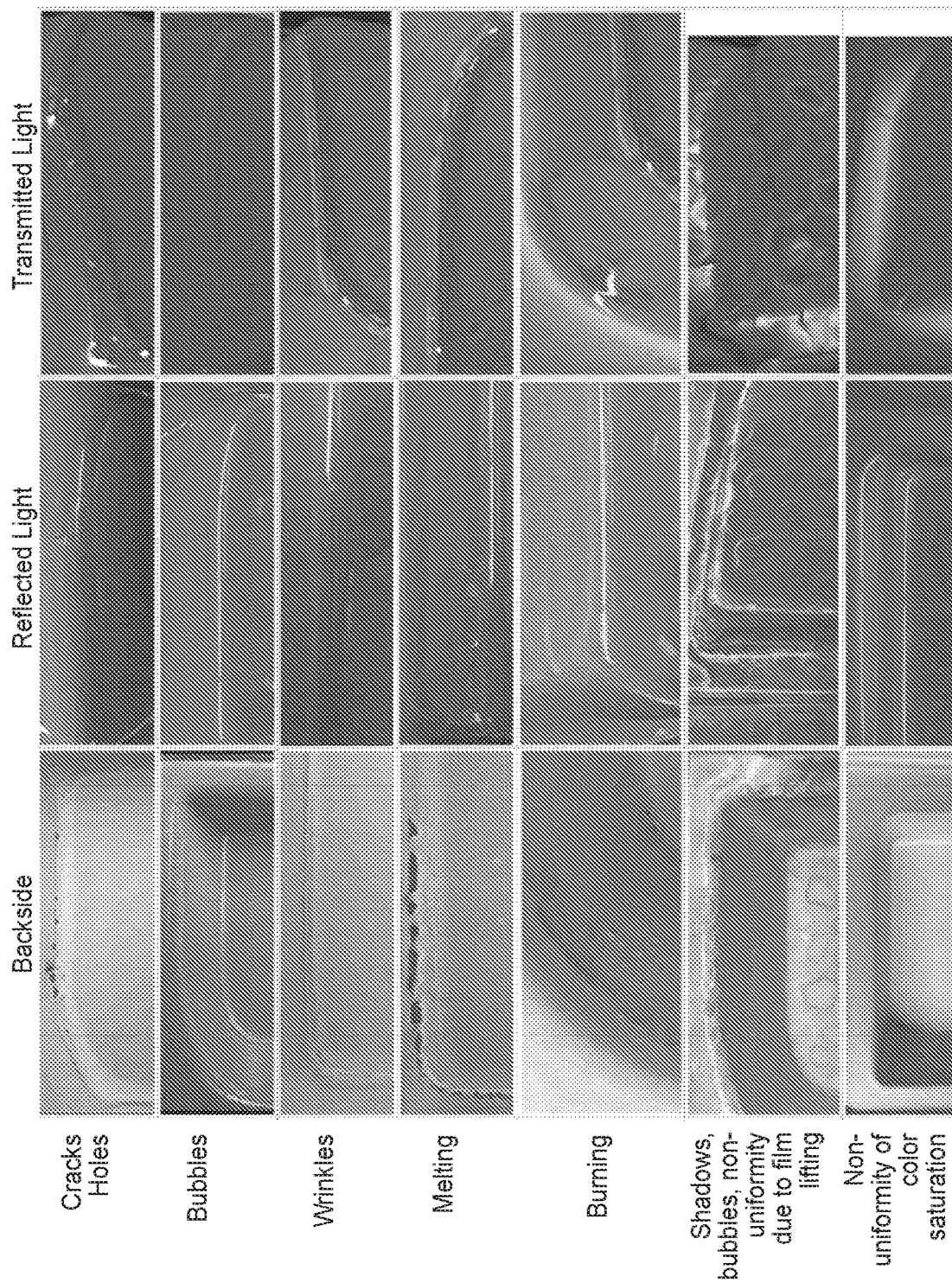
FIG. 3 shows defects identified in Evaluation Criteria for the examples.

Each of the Evaluation Criteria are illustrated in FIG. 3.

EXAMPLES

All substrates were dried, cleaned, and applied using the recommended thermoforming film application procedure specified in 3M Thermoforming Instruction Bulletin 5.16 (3M Company, St. Paul, MN). The mold used in generating the Examples was fabricated out of MDF (Medium Density Fiberboard). The mold shape was a trapezoidal frustum with base of 8 in×8 in (20.3 cm×20.3 cm) and top 6.75 in×6.75 in (17.1 cm×17.1 cm) and depth of 2.25 in (5.71 cm). The mold's four sides were designed such that various draft angles and edge geometries could be evaluated. The Draft Angle for sides A and B was 6.4 degrees with an edge radius of 0.25 in (0.64 cm). The Draft Angle for sides C and D was 20 degrees with an edge radius of 9/32 in (0.71 cm). One of the corners, when observed from the top, was rounded at a radius of approximately 2 in (5.08 cm) in reference to the top surface of the mold, while carrying the 20 deg draft angle through to the rounded base. The mold is shown in FIGS. 4A and 4B.

FIG. 4C shows the laminated layers. The film that came into contact with the mold was the shielding film layer (backside of the resulting thermoformed part). The substrate was on the outer most surface of the laminate (front side of the resulting thermoformed part).

Example 1—(E1)

B1, D1, and T1 were laminated to S1 using the 3M Translucent Thermoforming Instruction Bulletin 5.16 (3M Company, St. Paul, MN) procedure for film application. The construction was then placed on top of a mold and thermoformed at 380° F.-420° F. (193° C.-215° C.). E1 was evaluated and passed the Visual Inspection Test and successfully protected D1, and T1. E1 had no tearing, bubbles, burning, or ripping defects and substantially complete formability or replication of the mold was reached. The results are shown in FIG. 5 and below Table 2.

Example 2—(E2)

B1, D2, and T1 were laminated to S1 using the same process used in E1. The construction was thermoformed at 380° F.-420° F. (193° C.-215° C.). E2 was evaluated passed the Visual Inspection Test and successfully protected D2, and T1. E2 had no tearing, bubbles, burning, or ripping defects and complete formability or replication of the mold was reached. The results are shown below in Table 2.

Example 3—(E3)

B2, D2, and T1 were laminated to S2 using the same process used in E1. The construction was thermoformed at 360° F.-385° F. (182° C.-196° C.). E3 was evaluated and passed the Visual Inspection Test and successfully protected D2 and T1. E3 had no tearing, bubbles, burning, or ripping defects and complete formability or replication of the mold was reached. The results are shown below in Table 2.

Example 4—(E4)

B2, D2, and T1 were laminated to S3 using the same process used in E1. The construction was thermoformed at 360° F.-385° F. (182° C.-196° C.). E4 was evaluated and passed the Visual Inspection Test and successfully protected D2 and T1. E4 had no tearing, bubbles, burning, or ripping defects and complete formability or replication of the mold was reached. The results are shown below in Table 2.

Example 5—(E5)

B1 and T1 were laminated to S1 using the same process used in E1. The construction was thermoformed at 380° F.-420° F. (193° C.-215° C.). E5 was evaluated and passed the Visual Inspection Test and successfully protected T1. E5 had no tearing, bubbles, burning, or ripping defects and complete formability or replication of the mold was reached. The results are shown below in Table 2.

Comparative Example 1—No Shielding Film (CE1)

D2 and T1 were laminated to S1 using the same process used in E1. The construction was thermoformed at 380° F.-420° F. (193° C.-215° C.). CE1 failed the Visual Inspection Test. CE1 had tearing, burning, and ripping defects. The results are shown in FIG. 6 and below in Table 2.

TABLE 2

Experiment results from Visual Inspection test

| Example | Shielding Film | Diffuser Film | Translucent Film | Substrate | Replicates | Thickness of substrate (cm) | Pre-conditioning Drying Oven (Celsius) | Time (hrs) | Results: Pass/Fail |
| --- | --- | --- | --- | --- | --- | --- | --- | --- | --- |
| E1 | B1 | D1 | T1 | S1 | 2 | 0.299 | 76 | 24 | Pass |
| E2 | B1 | D2 | T1 | S1 | 2 | 0.299 | 76 | 24 | Pass |
| E3 | B2 | D2 | T1 | S2 | 2 | 0.299 | 76 | 24 | Pass |
| E4 | B2 | D2 | T1 | S3 | 2 | 0.299 | 76 | 24 | Pass |
| E5 | B1 | none | T1 | S1 | 2 | 0.299 | 76 | 24 | Pass |
| CE1 | none | D1 | T1 | S1 | 2 | 0.299 | 76 | 24 | Fail |

What is claimed is:

1. A method of thermoforming a rigid film construction, comprising:
   applying a rigid film construction to a mold; and
   heating the rigid film construction until it conforms to the mold;
   wherein the rigid film construction comprises:
      a rigid polymeric film layer having a thickness of approximately 1 mm to 5 mm;
      a light-modifying film layer; and
      a shielding film layer,
   wherein the shielding film comprises polymethyl methacrylate (PMMA); and
   wherein the shielding film layer contacts a convex surface of the mold.

2. The method of claim 1, wherein the rigid polymeric film layer comprises at least one of: polycarbonate, acrylic, polyethylene terephthalate, and polyethylene terephthalate glycol.

3. The method of claim 1, further comprising the step of applying a vacuum to the side of the mold opposite the rigid film construction.

4. The method of claim 1, wherein the light modifying film layer is a vinyl film.

5. The method of claim 1, wherein the light modifying film layer further comprises a printed ink layer.

6. The method of claim 1, wherein the light modifying film layer is translucent.

7. The method of claim 1, wherein the light modifying film layer serves as a diffuser.

8. The method of claim 1, wherein the shielding film layer is optically inert.

9. The method of claim 1, wherein the shielding film layer has a thickness of less than 100 micrometers.

10. A rigid film construction for use in a thermoforming process, the rigid film construction comprising:
   a rigid polymeric film layer having a thickness of approximately 1 mm to 5 mm;
   a light-modifying film layer; and
   a shielding film layer comprising polymethyl methacrylate (PMMA);
   wherein the shielding film layer is configured to contact a convex surface of a mold; and
   wherein the rigid film construction conforms to the convex surface of the mold when heated.

11. The rigid film construction of claim 10, wherein the rigid polymeric film layer comprises at least one of: polycarbonate, polyethylene terephthalate or acrylic.

12. The rigid film construction of claim 10, wherein the light modifying film layer is a vinyl film.

13. The rigid film construction of claim 10, wherein the light modifying film layer further comprises a printed ink layer.

14. The rigid film construction of claim 10, wherein the light modifying film layer is translucent.

15. The rigid film construction of claim 10, wherein the light modifying film layer serves as a diffuser.

16. The rigid film construction of claim 10, wherein the shielding film layer is optically inert.

17. The rigid film construction of claim 10, wherein the shielding film layer has a thickness of less than 150 micrometers.

18. The rigid film construction of claim 10, wherein the shielding film layer consists of polymethyl methacrylate.

19. The rigid film construction of claim 10, wherein the light modifying layer is structured to include a lenses or light extraction features.

20. The rigid film construction of claim 10, wherein the rigid polymeric film is transparent.

* * * * *